United States Patent [19]

Borrman et al.

[11] Patent Number: 4,553,764
[45] Date of Patent: Nov. 19, 1985

[54] FLEXIBLE, ANNULAR METALLIC SEALING DEVICE

[75] Inventors: Bo Borrman; Roberto Puggioli, both of Västerås, Sweden

[73] Assignee: AB Asea Atom, Sweden

[21] Appl. No.: 686,801

[22] Filed: Dec. 27, 1984

[30] Foreign Application Priority Data

Dec. 30, 1983 [SE] Sweden .............................. 8307230

[51] Int. Cl.⁴ .......................... F16J 15/08; F16J 15/48
[52] U.S. Cl. ...................................... 277/226; 277/34; 277/200; 277/236
[58] Field of Search ........................ 277/34, 34.3, 34.6, 277/200, 205, 206 R, 226, 236

[56] References Cited

U.S. PATENT DOCUMENTS 2,306,160 12/1942 Freyssinet ............................... 277/34
3,385,604 5/1968 Traufler ............................ 277/34.3 X
3,929,253 12/1975 Johnsson ........................... 277/236 X
4,214,760 7/1980 Godfrey ............................... 277/34.3
4,319,758 3/1982 Nicholson ......................... 277/236 X

FOREIGN PATENT DOCUMENTS 2523682 9/1983 France .................................... 277/34
1223605 2/1971 United Kingdom ................... 277/34

Primary Examiner—Robert S. Ward
Attorney, Agent, or Firm—Pollock, Vande Sande & Priddy

[57] ABSTRACT

A metallic, annular sealing device for closing an annular passage between a high-pressure chamber (2) and a circular cover (3) therefor. The sealing device comprises two coaxial, solid rings (17, 18) which are arranged with an intermediate circular gap. An upper (22) and a lower (21) hollow metal ring are each made with a circular gap. The edges of the gap of the upper hollow ring are welded to the solid rings (17, 18) at the upper portion of the gap defined between the solid rings, whereas the edges of the gap of the lower hollow ring are welded to the lower portion of the gap defined between the solid rings. Thus, the hollow rings (21, 22) communicate with each other.

2 Claims, 2 Drawing Figures

FLEXIBLE, ANNULAR METALLIC SEALING DEVICE

TECHNICAL FIELD

The present invention relates to a flexible, annular sealing device arranged for sealing between a high-pressure fluid and a low-pressure fluid, said sealing device having a high-pressure surface arranged in contact with said high-pressure fluid, and a low-pressure surface arranged in contact with said low-pressure fluid, and comprising a rigid, radially inner annular member, a radially outer annular member, and a flexible annular portion, said inner annular member and said outer annular member being mechanically and pressure-tightly connected to each other by means of said flexible annular portion.

DISCUSSION OF PRIOR ART

In a known sealing device of the above-mentioned type described in U.S. Pat. No. 3,062,401, the flexible annular portion comprises only *one* slotted, hollow ring. The cavity thereof communicates with the above-mentioned high pressure fluid.

The known device has certain disadvantages. If a rupture occurs in the hollow ring, the point of rupture will thus constitute a pneumatic connection between the high-pressure side and the low-pressure side of the sealing device.

DISCLOSURE OF THE INVENTION

The inconvenience mentioned above is avoided with a device according to the invention. Further, the advantage is gained that the pressure effect of the high-pressure fluid on the hollow ring is counteracted, to a greater or smaller extent, by a fluid enclosed within said ring. A device according to the invention also has the advantage that, in the event of a leakage of the hollow ring subjected to stress by high-pressure fluid, a clear indication is obtained of the condition while the sealing device is still intact. This indication is in the form of a pressure increase occurring in the space defined by a hollow body which is pneumatically or hydraulically connected to the above-mentioned hollow ring, due to the fact that this space is pressurized with the pressure of the above-mentioned high pressure fluid if such a leakage arises.

In a flexible, annular sealing device according to the invention, said high-pressure surface is partially constituted by the external surface of a first hollow, metallic ring, included in said flexible portion, whereas said low pressure surface is partially constituted by the external surface of a second hollow metallic ring included in said flexible portion, each of said hollow rings along its entire tangential extension having a gap, the edges of which are pressure-tightly mechanically connected to said inner and said outer annular member, respectively, said hollow rings being pneumatically connected to each other by means of said annular members.

Figure 1:
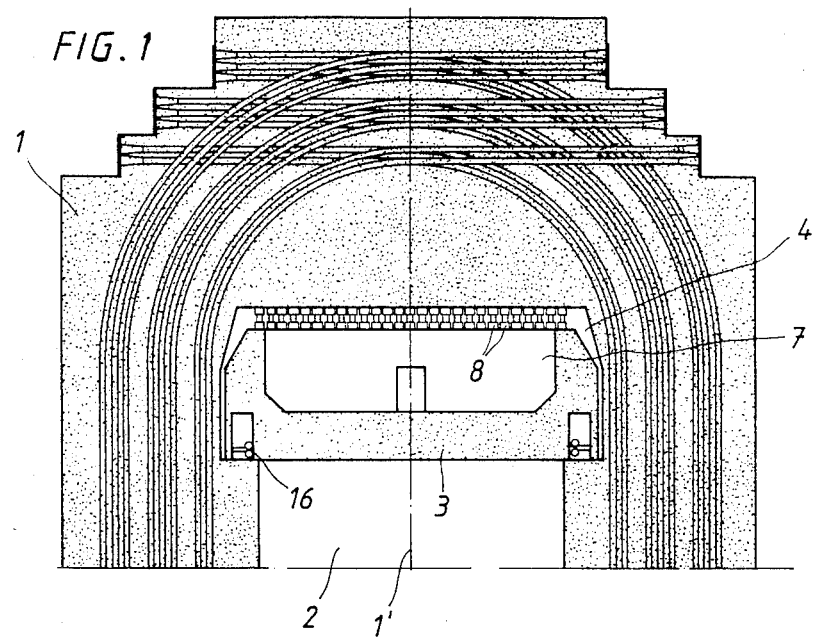
FIG. 1 shows a partial vertical section through a pressure vessel with an associated cover, a sealing device according to the invention being arranged to seal between the pressure vessel and the cover.

The concrete structures disclosed are identical with those described in the Swedish patent publication No. 435.981.

DESCRIPTION OF A PREFERRED EMBODIMENT

In the drawings, 1 designates a hollow concrete body which comprises a substantially circular-cylindrical high-pressure space 2. By means of a cover 3 made of prestressed concrete, the high-pressure space 2 encloses a nuclear reactor core (not shown) as well as a high-pressure fluid in the form of an aqueous solution with a pressure of at least 20 bar. The concrete body 1 also defines an auxiliary space 4, located above the high-pressure space 2, said auxiliary space containing a low-pressure fluid in the form of air of atmospheric pressure. Similar to the high-pressure space 2, the auxiliary space 4 is made with the same shape and position as a corresponding imaginary solid of revolution around a vertical axis of rotation 1'. The hollow concrete body 1 is provided with a horizontal tunnel through which the cover 3 can be moved into the auxiliary space 4 or be removed therefrom.

Figure 2:
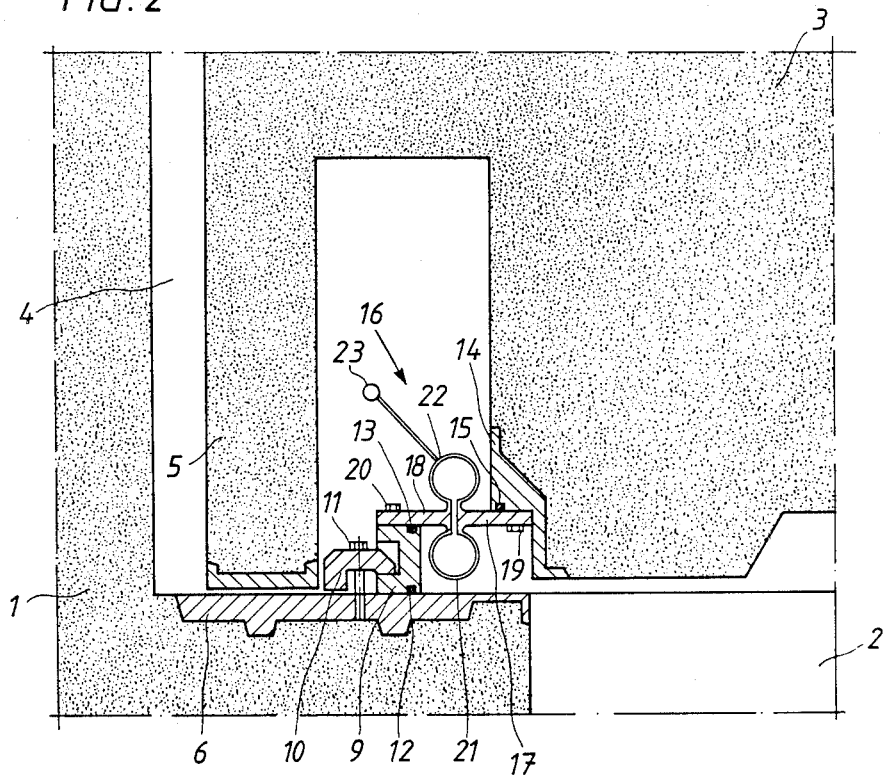
FIG. 2 shows a detail of FIG. 1.

FIGS. 1 and 2 show a condition when normal operating pressure prevails in the high-pressure space 2. At atmospheric pressure therein, the cover 3, which has a plurality of vertical legs 5, is positioned on a horizontal metallic ring 6, embedded in the concrete body 1. The cover 3 has a plurality of parallel force transmitting walls 7, each lying in a vertical plane, each wall supporting a plurality of pressure transmitting elements 8 which, at operating pressure in the high-pressure space 2, transfer the force acting on the cover 3 to a roof surface in the auxiliary space 4. With the aid of a plurality of yokes 10 an annular, circular holder 9 for sealing rings is clamped against the metallic ring 6 embedded in the concrete. The yokes 10 are pressed downwards by means of corresponding threaded bolts 11 screwed into the metallic ring 6. The holder 9 is provided with a downwardly-facing circular slot, in which a sealing ring 12—preferably of rubber or the like, alternatively of metal—is arranged, and with an upwardly-facing circular slot, in which a sealing ring 13 is arranged. The cover 3 is provided at the bottom with a metallic, circular cover ring 14, embedded in the concrete, said ring having a downwardly-facing slot, in which a sealing ring 15 is arranged. The sealing rings 13 and 15 are preferably made of the same material as the sealing ring 12.

An annular sealing device 16 is arranged to block an annular passageway between the cover ring 14 and the circular holder 9. The sealing device 16 comprises a rigid, metallic, radially inner, circular, annular member 17, substantially located in a horizontal plane, and a rigid, metallic, radially outer, annular, circular member 18, which is coaxially arranged in relation to the member 17 around the common, vertical symmetry axis 1'. The annular member 17 is pressed against the sealing ring 15 with the aid of a plurality of threaded bolts 19 screwed into the cover ring 14. The annular member 18 is pressed against the sealing ring 13 with the aid of a plurality of threaded bolts 20 screwed into the holder 9. In addition, the annular sealing device 16 has a flexible, annular mid-portion which comprises two hollow, circular metallic rings 21 and 22 formed with circular cross sections, said rings being slotted along the entire length of the rings in such a way that the radius of the gap in each of the rings 21 and 22 is equal to or approximately equal to the radius of centre of gravity of the ring cross section in relation to the axis 1'. In each one of the rings 21 and 22, one edge of the annular gap is welded to the outer edge of the annular member 17, whereas the other edge is welded to the inner edge of the annular member 18.

The sealing device has a high-pressure surface, that is, a surface which is in contact with a high-pressure fluid, namely, the liquid present in the high-pressure space 2. This high-pressure surface is constituted partially by the external surface of the hollow ring 21. The external surface of the ring 22 constitutes part of the low-pressure surface of the sealing device, that is, a surface which is in contact with a low-pressure fluid, more particularly air of atmospheric pressure.

For the purpose of reducing the compressive stress on the ring 21, the hollow rings 21 and 22, which are pneumatically connected to each other by means of the annular members 17 and 18, may advantageously contain an amount of gas, the pressure of which at 100° C. is at least 50% higher than the atmospheric pressure in the environment. The gas may either be saturated or unsaturated.

A pressure transducer 23 is pneumatically connected to the hollow ring 22 to give an electrical signal upon a possible pressure increase due to a leakage occurring in the hollow ring 21.

We claim:

1. A flexible, annular sealing device arranged for sealing between a high-pressure fluid and a low-pressure fluid, said sealing device having a high-pressure surface arranged in contact with said high-pressure fluid, and a low-pressure surface arranged in contact with said low-pressure fluid, and comprising a rigid, radially inner annular member (17), a radially outer annular member (18), and a flexible annular portion, said inner annular member and said outer annular member being mechanically and pressure-tightly connected to each other by means of said flexible annular portion (21, 22), wherein said high-pressure surface is partially constituted by the external surface of a first hollow, metallic ring (21) included in said flexible portion, whereas said low-pressure surface is partially constituted by the external surface of a second hollow metallic ring (22) included in said flexible portion, each of said hollow rings along its entire tangential extension having a gap, the edges of which are pressure-tightly mechanically connected to said inner and said outer annular member, respectively, said hollow rings (21, 22) being pneumatically connected to each other by means of said annular members (17, 18).

2. Annular sealing device according to claim 1, wherein said hollow rings (21, 22) enclose an amount of gas, the pressure of which at 100° C. is at least 50% higher than the atmospheric pressure of the environment.

* * * * *